United States Patent
Yamada et al.

(10) Patent No.: US 10,505,176 B2
(45) Date of Patent: Dec. 10, 2019

(54) POWER STORAGE DEVICE MANUFACTURING METHOD, MANUFACTURING DEVICE, LIQUID INJECTION DEVICE, AND LIQUID INJECTION METHOD

(71) Applicant: KABUSHIKI KAISHA TOYOTA JIDOSHOKKI, Kariya-shi, Aichi (JP)

(72) Inventors: Hidaka Yamada, Kariya (JP); Yohei Hamaguchi, Kariya (JP); Kyoichi Kinoshita, Kariya (JP); Yusuke Yamaguchi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 343 days.

(21) Appl. No.: 15/112,888

(22) PCT Filed: Jan. 22, 2015

(86) PCT No.: PCT/JP2015/051714
§ 371 (c)(1),
(2) Date: Jul. 20, 2016

(87) PCT Pub. No.: WO2015/111665
PCT Pub. Date: Jul. 30, 2015

(65) Prior Publication Data
US 2016/0344014 A1 Nov. 24, 2016

(30) Foreign Application Priority Data

Jan. 23, 2014 (JP) .................................. 2014-010290
Jan. 23, 2014 (JP) .................................. 2014-010555

(51) Int. Cl.
*H01M 2/36* (2006.01)
*G01F 17/00* (2006.01)
(Continued)

(52) U.S. Cl.
CPC ............ *H01M 2/365* (2013.01); *G01F 17/00* (2013.01); *G01M 3/329* (2013.01); *H01M 10/04* (2013.01); *H01M 10/4228* (2013.01)

(58) Field of Classification Search
CPC .. H01M 2/365; H01M 10/4228; H01M 10/04; G01F 17/00; G01M 3/329
See application file for complete search history.

(56) References Cited

U.S. PATENT DOCUMENTS 4,442,700 A * 4/1984 Swoboda ................. G01N 9/24
73/32 A
4,925,750 A * 5/1990 Theiss ..................... B60R 16/04
429/116

(Continued)

FOREIGN PATENT DOCUMENTS

JP 62206427 A 9/1987
JP 5325944 A 12/1993

(Continued)

OTHER PUBLICATIONS

International Preliminary Report on Patentability issued from the International Bureau in counterpart International Application No. PCT/JP2015/051714, dated Aug. 4, 2016.

(Continued)

*Primary Examiner* — Peter Dungba Vo
*Assistant Examiner* — Jeffrey T Carley
(74) *Attorney, Agent, or Firm* — Sughrue Mion, PLLC (57) ABSTRACT

A power storage device manufacturing method that seals a case housing an electrode assembly of a power storage device and injects an electrolyte into the case after sealing, the method includes a step accompanied by a pressure operation of increasing or reducing a pressure inside the case after sealing the case, and a process performed in a state of turning the inside of the case to the pressure higher or lower than an atmospheric pressure, and an internal space capacity (Continued)

of the case is measured based on a change with time of the pressure inside the case caused by the pressure operation inside the case.

5 Claims, 6 Drawing Sheets

(51) Int. Cl.
*H01M 10/04* (2006.01)
*G01M 3/32* (2006.01)
*H01M 10/42* (2006.01)

(56) References Cited

U.S. PATENT DOCUMENTS

| | | | | |
|---|---|---|---|---|
| 6,635,379 B2* | 10/2003 | Onishi | ................ | H01M 6/5083 |
| | | | | 429/48 |
| 7,291,186 B2* | 11/2007 | Zhang | ................... | H01M 4/244 |
| | | | | 29/623.1 |
| 2006/0134511 A1* | 6/2006 | Ito | ....................... | H01M 6/5044 |
| | | | | 429/90 |
| 2009/0004511 A1* | 1/2009 | Hlavac | .................... | H01M 2/12 |
| | | | | 429/3 |
| 2012/0308905 A1* | 12/2012 | Kawahara | ......... | H01M 8/04223 |
| | | | | 429/414 |
| 2013/0025741 A1* | 1/2013 | Yamaura | .................. | H01M 2/36 |
| | | | | 141/1.1 |
| 2014/0310950 A1* | 10/2014 | Tamaki | .................. | H01M 2/361 |
| | | | | 29/623.1 |
| 2015/0171461 A1* | 6/2015 | Akutsu | .................. | H01M 10/04 |
| | | | | 29/623.2 |
| 2016/0087315 A1* | 3/2016 | Oyama | .................. | H01M 4/505 |
| | | | | 429/61 |

FOREIGN PATENT DOCUMENTS

| | | | |
|---|---|---|---|
| JP | 09259896 A | * | 10/1997 |
| JP | 11096992 A | | 4/1999 |
| JP | 2000090957 A | | 3/2000 |
| JP | 2004022502 A | | 1/2004 |
| JP | 2004031239 A | | 1/2004 |
| JP | 2005251738 A | | 9/2005 |
| JP | 2010244898 A | | 10/2010 |
| JP | 2013077524 A | * | 4/2013 |

OTHER PUBLICATIONS

International Search Report, issued by International Searching Authority in corresponding International Application No. PCT/JP2015/051714, dated Apr. 28, 2015.

Communication dated Jul. 11, 2017, from the Japanese Patent Office in counterpart Japanese application No. 2015-559109.

* cited by examiner

POWER STORAGE DEVICE MANUFACTURING METHOD, MANUFACTURING DEVICE, LIQUID INJECTION DEVICE, AND LIQUID INJECTION METHOD

CROSS REFERENCE TO RELATED APPLICATIONS

This application is a National Stage of International Application No. PCT/JP2015/051714 filed Jan. 22, 2015, claiming priorities based on Japanese Patent Application Nos. 2014-010290 filed Jan. 23, 2014 and 2014-010555 filed Jan. 23, 2014, the contents of all of which are incorporated herein by reference in their entirety.

TECHNICAL FIELD

The present invention relates to a power storage device manufacturing method, a manufacturing device, a liquid injection device, and a liquid injection method.

BACKGROUND ART

Conventionally, as a secondary battery, which is a kind of a power storage device, a lithium-ion secondary battery and a nickel-hydrogen secondary battery or the like are well-known, for example. In a power storage device manufacturing process, there are a step of housing an electrode assembly inside a case of a power storage device and then sealing the case, and a step of injecting an electrolyte to the case. Further, sometimes there is a step of inspecting airtightness of the case before injecting the electrolyte. For example, Patent Literature 1 discloses an airtightness inspection of detecting presence/absence of gas leakage while forcibly feeding a gas into a housing.

In addition, when injecting an electrolyte, for example, Patent Literatures 2-5 disclose a technology of reducing a pressure inside a container before liquid injection and injecting the liquid by utilizing a differential pressure between an inner side and outer side of the container. Generally, an amount of the electrolyte to be injected into a battery case is a fixed amount (prescribed amount) determined beforehand, and the amount is not changed for each battery case. As a technology of accurately verifying an amount of the injected electrolyte, as described in Patent Literatures 2, 3 and 6 for example, a technology of measuring weight of a battery case before and after the injection is known.

However, since a cavity inside a battery case in which an electrode assembly is housed is different for each battery strictly, it is preferable to inject an appropriate amount of the electrolyte to each battery. Therefore, in a manufacturing process of a power storage device using the electrolyte such as a lithium-ion battery, it has been examined to measure a capacity of an internal space of a case after sealing the case of the power storage device and before injecting the electrolyte into the case. For example, in a lithium-ion battery, when the electrolyte in a liquid state not impregnated in an electrode assembly is remained inside the case, waste of the electrolyte is generated. In addition, when the electrolyte becomes further excessive, it contributes to gas generation. On the other hand, when the amount of the electrolyte is insufficient, a part not sufficiently impregnated with the electrolyte is generated in an active material layer of laminated positive and negative electrodes and a separator (hereinafter, called an electrode assembly), and a performance of a battery is lowered. Therefore, it is desirable to inject an amount of the electrolyte which is optimum for each battery. For variation in terms of manufacturing of the case and the electrode assembly, as one of measures to obtain a liquid injection amount which is optimum for each battery, measurement of the capacity of the internal space is conceivable. For example, Patent Literature 4 discloses a cavity volume measuring device which obtains a cavity volume inside a battery can using Boyle's law.

CITATION LIST

Patent Literature

Patent Literature 1: Japanese Unexamined Patent Publication No. 2010-244898
Patent Literature 2: Japanese Unexamined Patent Publication No. H11-096992
Patent Literature 3: Japanese Unexamined Patent Publication No. 2004-022502
Patent Literature 4: Japanese Unexamined Patent Publication No. 2000-090957
Patent Literature 5: Japanese Unexamined Patent Publication No. H5-325944
Patent Literature 6: Japanese Unexamined Patent Publication No. 2004-31239

SUMMARY OF INVENTION

Technical Problem

However, when measuring an internal space capacity on a manufacturing line, there is a problem of lowering manufacturing efficiency. For example, when detecting a pressure change, since attachment that can obtain sufficient airtightness and pressure detection in a stable state are demanded, it is difficult to shorten work time in a process. That is, in the case of using the technology in Patent Literature 4, the amount of the electrolyte to be injected can be turned to an appropriate amount, however, since a process of detecting an internal cavity volume is required before injection, the work time needed for the liquid injection becomes long, and work efficiency is deteriorated. Therefore, when the internal space capacity is measured, manufacturing efficiency is greatly reduced.

The present invention provides a power storage device manufacturing method, a manufacturing device, a liquid injection device, and a liquid injection method capable of suppressing reduction in manufacturing efficiency of a power storage device while adopting measurement of the internal space capacity.

Solution to Problem

A power storage device manufacturing method relating to one aspect of the present invention is a power storage device manufacturing method that seals a case housing an electrode assembly of a power storage device and injects an electrolyte into the case after sealing. This power storage device manufacturing method comprises a step accompanied by a pressure operation of increasing or reducing a pressure inside the case after sealing the case, and a process performed in a state of turning the inside of the case to the pressure higher or lower than an atmospheric pressure, and an internal space capacity of the case is measured based on a change with time of the pressure inside the case caused by the pressure operation inside the case.

In this power storage device manufacturing method, there is a step accompanied by a pressure operation of increasing or reducing a pressure inside the case, and a process performed in a state of turning the inside of the case to the pressure higher or lower than an atmospheric pressure. While the pressure inside the case is changed by the pressure operation, and at the time, an internal space capacity affects a pressure change with time. On the basis of the pressure change, the internal space capacity is measured. Therefore, the internal space capacity can be measured in parallel with the pressure operation corresponding to preliminary preparation for example of the process performed in the state of turning the inside of the case to a high pressure or a low pressure. As a result, reduction in manufacturing efficiency of the power storage device can be suppressed while adopting measurement of the internal space capacity.

The step accompanied by the pressure operation inside the case may be an airtightness inspecting step for the case. In this case, the pressure operation inside the case is executed in the case airtightness inspecting step. Therefore, an airtightness inspection of the case of the power storage device and the measurement of the internal space capacity of the case of the power storage device can be performed in parallel. As a result, the time needed for the airtightness inspection of the case of the power storage device and the measurement of the internal space capacity of the case of the power storage device can be shortened, and the reduction in the manufacturing efficiency of the power storage device can be suppressed while adopting the measurement of the internal space capacity.

The step accompanied by the pressure operation inside the case may be an electrolyte injecting step. In this case, the pressure operation inside the case is executed for injecting an electrolyte. Therefore, injection of the electrolyte and the measurement of the internal space capacity of the case of the power storage device can be performed in parallel. As a result, the time needed for the injection of the electrolyte and the measurement of the internal space capacity of the case of the power storage device can be shortened, and the reduction in manufacturing efficiency of the power storage device can be suppressed while adopting the measurement of the internal space capacity.

A power storage device manufacturing device relating to another aspect of the present invention comprises a chamber configured to house a power storage device, a gas supply source configured to supply a gas into a case of the power storage device, a gas detector configured to detect the gas inside the chamber, a suction machine configured to suck the gas from the inside of the case, a flow rate adjuster configured to fix a flow rate of the gas supplied by the gas supply source or a flow rate of the gas sucked by the suction machine, a pressure gauge configured to measure an air pressure inside the case, and a computing unit configured to compute an internal space capacity of the case, based on the air pressure measured by the pressure gauge.

In this power storage device manufacturing device, the flow rate of the gas supplied into the case or the flow rate of the gas sucked from the inside of the case is fixed. Therefore, when the flow rate of the gas supplied into the case is fixed for example, the internal space capacity of the case can be computed by the air pressure inside the case while the gas is supplied into the case for the airtightness inspection. Also, when the flow rate of the gas sucked from the inside of the case is fixed, the internal space capacity of the case can be computed by the air pressure inside the case while the gas supplied into the case for the airtightness inspection is sucked from the inside of the case. Thus, the airtightness inspection of the case of the power storage device and the measurement of the internal space capacity of the case of the power storage device can be performed in parallel. As a result, the time needed for the airtightness inspection of the case of the power storage device and the measurement of the internal space capacity of the case of the power storage device can be shortened, and the reduction in manufacturing efficiency of the power storage device can be suppressed while adopting the measurement of the internal space capacity.

The power storage device manufacturing device relating to yet another aspect of the present invention may comprise a timing unit configured to measure elapsed time when the gas is supplied or sucked. The flow rate adjuster may fix the flow rate of the gas supplied by the gas supply source, and the computing unit may compute the internal space capacity of the case, based on a plurality of air pressures measured by the pressure gauge while the gas supply source supplies the gas into the case and the elapsed time between the air pressures. In this case, the internal space capacity of the case can be computed by the air pressure inside the case while the gas is supplied into the case for the airtightness inspection. Therefore, the airtightness inspection of the case of the power storage device and the measurement of the internal space capacity of the case of the power storage device can be performed in parallel. As a result, the time needed for the airtightness inspection of the case of the power storage device and the measurement of the internal space capacity of the case of the power storage device can be shortened, and the reduction in manufacturing efficiency of the power storage device can be suppressed while adopting the measurement of the internal space capacity.

The power storage device manufacturing device relating to yet another aspect of the present invention may comprise a timing unit configured to measure elapsed time when the gas is supplied or sucked. The flow rate adjuster may fix the flow rate of the gas sucked by the suction machine, and the computing unit may compute the internal space capacity of the case, based on a plurality of air pressures measured by the pressure gauge while the suction machine sucks the gas from the inside of the case and the elapsed time between the air pressures. In this case, the internal space capacity of the case can be computed by the air pressure inside the case while the gas supplied into the case for the airtightness inspection is sucked from the inside of the case. Therefore, the airtightness inspection of the case of the power storage device and the measurement of the internal space capacity of the case of the power storage device can be performed in parallel. As a result, the time needed for the airtightness inspection of the case of the power storage device and the measurement of the internal space capacity of the case of the power storage device can be shortened, and the reduction in manufacturing efficiency of the power storage device can be suppressed while adopting the measurement of the internal space capacity.

The power storage device manufacturing device relating to yet another aspect of the present invention may further comprise a valve configured to switch and connect the gas supply source and the suction machine to the case. In this case, the gas supply source and the suction machine are not needed to be connected to the case respectively, and a structure can be as simple as just connecting the gas supply source and the suction machine to the valve. Therefore, for example, by utilizing a liquid injecting port of the case, the gas supply source and the suction machine can be connected. Then, by switching the gas supply source and the suction machine using the valve, supply of the gas to the case and suction of the gas from the case can be easily switched.

A power storage device liquid injection device relating to yet another aspect of the present invention comprises a measuring unit configured to measure a cavity volume inside a case housing an electrode assembly of a power storage device by reducing a pressure inside the case, and a liquid injecting unit configured to inject, into the case, an electrolyte in an amount based on the cavity volume measured by the measuring unit.

In the power storage device liquid injection device, the measuring unit performs both of pressure reduction inside the case and measurement of the cavity volume. Thus, the liquid injecting unit can inject the electrolyte for an appropriate amount based on the measured cavity volume into the pressure-reduced case. That is, since the pressure reduction inside the case and the measurement of the cavity volume are simultaneously performed by the measuring unit prior to liquid injection, the electrolyte can be efficiently injected.

A power storage device liquid injection method relating to yet another aspect of the present invention comprises a measuring step of measuring a cavity volume inside a case housing an electrode assembly of a power storage device by reducing a pressure inside the case, and a liquid injecting step of injecting, into the case, an electrolyte in an amount based on the cavity volume measured by the measuring step.

In the power storage device liquid injection method, in the measuring step, both of the pressure reduction inside the case and the measurement of the cavity volume are performed. Thereafter, in the liquid injecting step, the electrolyte for an appropriate amount based on the measured cavity volume is injected into the pressure-reduced case. That is, since the pressure reduction inside the case and the measurement of the cavity volume are simultaneously performed in the measuring step prior to the liquid injecting step, the electrolyte can be efficiently injected.

Advantageous Effects of Invention

According to the present invention, the reduction in manufacturing efficiency of the power storage device can be suppressed while adopting the measurement of the internal space capacity.

DESCRIPTION OF EMBODIMENTS

Hereinafter, embodiments of the present invention will be described in detail with reference to attached drawings. In description of the drawings, same signs are used for same or equivalent elements, and redundant descriptions will be omitted.

First Embodiment

Figure 1:
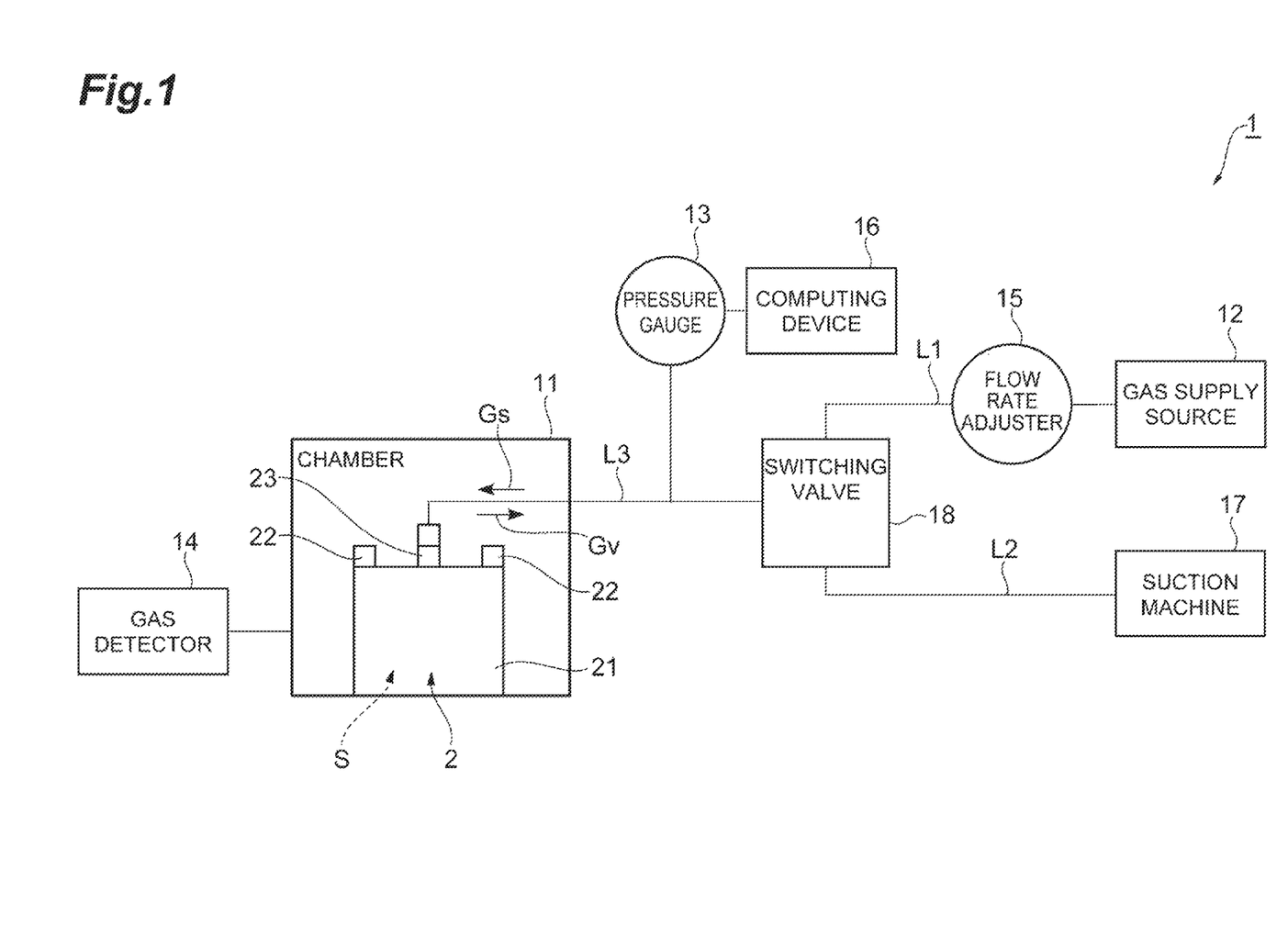
FIG. 1 is a schematic configuration diagram schematically illustrating a power storage device manufacturing device relating to a first embodiment.

FIG. 1 is a schematic configuration diagram schematically illustrating a power storage device manufacturing device relating to a first embodiment. As illustrated in FIG. 1, a manufacturing device 1 is a device for inspecting airtightness of a case 21 of a power storage device 2, and measuring a capacity of space S inside the case 21. The power storage device 2 is a battery with an electrolyte, and is a lithium-ion secondary battery in the present embodiment. However, the power storage device 2 is not limited to the lithium-ion secondary battery, and may be another secondary battery such as a nickel-hydrogen secondary battery, or another power storage device with an electrolyte (for example, an electric double layer capacitor or the like). The power storage device 2 is a power storage device after a lid member is attached to a case body and before the electrolyte is injected in a manufacturing process, and houses components such as an electrode assembly inside the case 21. The electrode assembly is configured by laminating some positive and negative electrodes having each active material layer on metal foil and some separators consisting of a porous resin.

The case 21 has an approximately rectangular parallelepiped shape. The case 21 consists of the lid member and a box-like case body having an upper opening, and after the components such as the electrode assembly are housed inside the case body, the lid member is fixed to the case body by means of laser welding or the like and united. A material of the case 21 is aluminum for example. Inside the case 21, a space S is formed. The space S consists of a space excluding the components such as the electrode assembly housed in the case 21 in the space formed inside the case 21 and a cavity in the active material layers and the separators in the electrode assembly. Of the space S, the cavity in the active material layers and the separators is filled with the electrolyte in a post process.

A basic laminate structure of the electrode assembly is as follows. For a positive electrode, a positive electrode active material layer is formed on a surface of the metal foil (aluminum foil) forming a positive electrode side current collector. The positive electrode active material layer consists of active material particles and a binder that binds the active material particles, and is porous. For a negative electrode, a negative electrode active material layer is formed on a surface of the metal foil (copper foil) forming a negative electrode side current collector. The negative electrode active material layer consists of active material particles and a binder that binds the active material particles, and is porous. The positive electrode active material layer and the negative electrode active material layer are laminated in a form of sandwiching the separator consisting of a porous and insulating resin therebetween. Then, by filling the inside of a hole (inside of the cavity) of the each active material layer and the separator with the electrolyte, ions become movable between the positive electrode and the negative electrode, and a function as a battery is demonstrated. On the other hand, the electrolyte not included inside the cavity, that is, the electrolyte not impregnated in the electrode assembly, does not contribute to a performance of the battery. Therefore, ideally, it is preferable that the electrolyte corresponding to the capacity of the cavity is injected and the entire amount of electrolyte is impregnated in the electrode assembly.

One example of a manufacturing step of the positive electrode and negative electrode active material layers will be described below. A negative electrode active material, the binder and a solvent are mixed to prepare negative electrode slurry. By coating the negative electrode slurry on the metal foil by a known coating method such as gravure coating, then removing the solvent by a drying machine, and compressing the slurry after drying to a predetermined thickness by a roll press, the negative electrode active material layer is formed. The positive electrode active material layer is formed by a similar method though the material is different. When coating the positive electrode or negative electrode slurry to the metal foil, a thickness (weight per unit area) of the slurry varies. This variation in the slurry thickness becomes variation in a density of the active material layer by compression by the roll press, and the capacity of the cavity inside the active material layer varies. Therefore, even though an outer dimension of each electrode assembly is the same dimension, the cavity inside varies. Of the space S, the space excluding the components such as the electrode assembly housed in the case 21 is fixed by equalizing the outer dimension of the electrode assembly. That is, by detecting the volume of the space S, the cavity inside the electrode assembly can be obtained.

On an upper surface of the case 21, a pair of electrode terminals 22 of the positive electrode and the negative electrode are protruded, and a liquid injecting port 23 is provided between the pair of electrode terminals 22. The electrode terminals 22 are terminals for taking out electricity stored by the power storage device 2 to the outside. The liquid injecting port 23 is an opening used to inject the electrolyte to the inside of the case 21.

In the case 21, the lid member and the case body are sealed by the laser welding described above. In addition, the electrode terminals 22 and the case are sealed by an unspecified sealing member. The liquid injecting port 23 is also sealed by a sealing plug after a step of known aging or the like performed after the electrolyte is injected, however, detailed descriptions are omitted here.

The manufacturing device 1 comprises, for example, a chamber 11, a gas supply source 12, a pressure gauge 13, a gas detector 14, a flow rate adjuster 15, a computing device 16 (computing unit), a suction machine 17, and a switching valve 18 (valve).

The manufacturing device 1 is further provided with piping L1, piping L2 and piping L3. The piping L1 is a tubular member for connecting the gas supply source 12 and the switching valve 18. The piping L2 is a tubular member for connecting the suction machine 17 and the switching valve 18. The piping L3 is a tubular member for connecting the switching valve 18 and the case 21. The piping L3 is connected to the liquid injecting port 23 in such a way as to keep airtightness of the case 21 for example.

The chamber 11 is sealed, and forms a space for housing the power storage device 2. An air pressure inside the chamber 11 before an operation is an atmospheric pressure for example.

The gas supply source 12 is a device for supplying a predetermined gas Gs to the inside of the case 21. That is, the gas supply source 12 supplies the gas Gs to the space S inside the case 21. As the gas Gs supplied by the gas supply source 12, a gas that exists in the atmosphere at a low rate, whose density change is easy to detect, such as helium (He) or hydrogen (H2), is used.

The pressure gauge 13 is a device for measuring the air pressure inside the case 21. The pressure gauge 13 transmits air pressure information indicating the measured air pressure to the computing device 16. The pressure gauge 13 is provided in the piping L3 for example.

The gas detector 14 is a device for detecting the gas Gs inside the chamber 11. That is, the gas detector 14 detects the gas Gs that leaks out from the case 21 of the gas Gs supplied to the space S inside the case 21 by the gas supply source 12. The gas detector 14 detects the gas Gs that leaks out from the case 21 by measuring the density of the gas Gs inside the chamber 11 for example. The gas Gs is detected while the air pressure inside the case 21 is set to a predetermined air pressure Ps (for example, 0.2 MPa).

The flow rate adjuster 15 is a device for fixing the flow rate of the gas Gs supplied to the case 21 by the gas supply source 12. The flow rate adjuster 15 is a constant flow valve for example, and its opening is adjusted such that the flow rate of the gas Gs supplied to the case 21 becomes a predetermined flow rate. The flow rate adjuster 15 is provided on the piping L1 for example.

The computing device 16 is a device for computing the capacity of the space S inside the case 21, based on the air pressure measured by the pressure gauge 13. The computing device 16 is a computer including a processor and a memory or the like for example. The capacity of the space S inside the case 21 is a sum of the capacity of the space excluding the components such as the electrode assembly housed in the case 21 and a cavity amount inside the electrode assembly. As described above, since the capacity of the space excluding the components such as the electrode assembly is fixed, obtaining the capacity of the space S is, in other words, obtaining the cavity amount inside the electrode assembly inside the case 21. The computing device 16 computes the capacity of the space S inside the case 21, based on the air pressure measured by the pressure gauge 13, while the gas supply source 12 supplies the gas Gs to the space S inside the case 21.

Specifically describing, the computing device 16 includes a timing unit such as a timer configured to measure elapsed time when the gas Gs is supplied, and measures the time needed for the air pressure indicated by the air pressure information transmitted by the pressure gauge 13 to reach an air pressure P2 from an air pressure P1. Here, the air pressure P1 and the air pressure P2 are predetermined air pressures, and the air pressure P1 is lower than the air pressure P2. The computing device 16 stores beforehand air pressure rising time data indicating a relation between the capacity of the space to which the gas Gs is supplied and the time needed for the air pressure of the space to reach the air pressure P2 from the air pressure P1 when the flow rate of the gas Gs is fixed. The air pressure rising time data can be provided in a form of a table or a function or the like. The computing device 16 refers to the air pressure rising time data, acquires the capacity corresponding to the measured time, and defines it as the capacity of the space S.

For example, the air pressure P1 may be the atmospheric pressure, and the air pressure P2 may be the air pressure Ps for the airtightness inspection. In this case, the computing device 16 measures the time needed for the air pressure inside the case 21 to reach the air pressure Ps from the time when the supply of the gas Gs to the space S of the case 21 is started by the gas supply source 12. At the time, as the cavity amount is larger, the time needed to reach the air pressure Ps becomes longer.

The suction machine 17 is a device for sucking a gas Gv including the gas Gs from the inside of the case 21. The suction machine 17 is a vacuum pump for example.

The switching valve 18 is a device for switching the gas supply source 12 and the suction machine 17 and connecting one of them to the case 21. The switching valve 18 is an air operation valve for example. Specifically, the switching valve 18 shuts off between one of either the piping L1 or the piping L2 and the piping L3, and opens up between the other of either the piping L1 or the piping L2 and the piping L3. The switching valve 18 switches from the gas supply source 12 to the suction machine 17 and connects the suction machine 17 to the case 21 in response to meeting the condition that the air pressure inside the case 21 reaches the air pressure Ps, for example.

Figure 2:
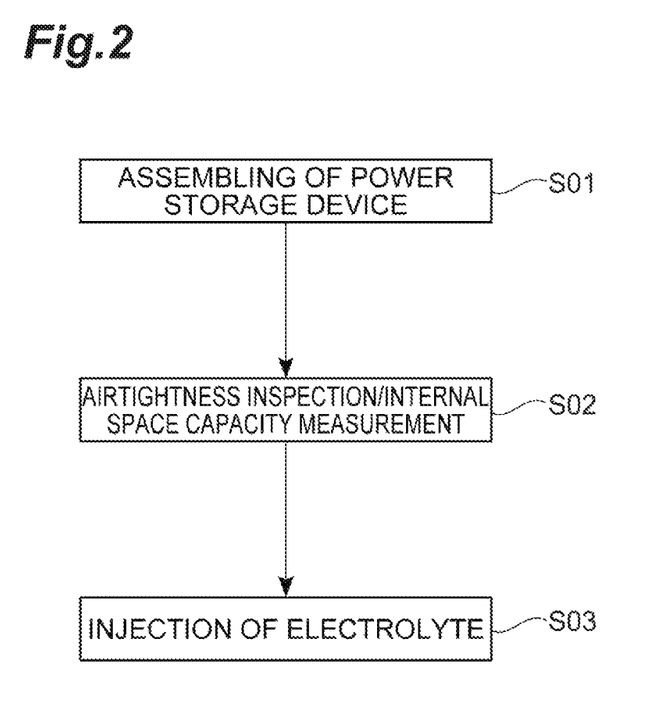
FIG. 2 is a flowchart schematically illustrating a power storage device manufacturing process using the manufacturing device in FIG. 1.

FIG. 2 is a flowchart schematically illustrating a power storage device manufacturing process using the manufacturing device 1. This flowchart illustrates steps from assembling of the power storage device 2 to the liquid injection of the power storage device manufacturing process.

As illustrated in FIG. 2, first, in step S01, the power storage device 2 is assembled. In this step S01, the power storage device 2 is assembled by housing the electrode assembly and so on inside the case body, fixing (sealing) the lid member to the case body by laser welding or the like, and uniting it.

Next, in step S02, the airtightness of the case 21 assembled in step S01 is inspected, and the capacity of the space S inside the case 21 is measured. Specifically, the power storage device 2 is housed inside the chamber 11, and one end of the piping L3 is connected to the liquid injecting port 23 of the power storage device 2. Then, the switching valve 18 connects the gas supply source 12 and the case 21, and the gas supply source 12 starts the supply of the gas Gs to the inside of the case 21. At the time, the flow rate of the gas Gs supplied from the gas supply source 12 is adjusted to be fixed by the flow rate adjuster 15.

The pressure gauge 13 measures the air pressure inside the case 21 throughout the supply of the gas Gs, and whether or not the air pressure inside the case 21 has reached the air pressure Ps is determined. The gas supply source 12 continuously supplies the gas Gs into the case 21 until the air pressure inside the case 21 reaches the air pressure Ps. Then, in response to meeting the condition that the air pressure inside the case 21 reaches the air pressure Ps, the gas supply source 12 stops the supply of the gas Gs. At the time, the computing device 16 measures the time needed for the air pressure inside the case 21 to reach the air pressure P2 from the air pressure P1. For example, the computing device 16 measures the time needed for the air pressure inside the case 21 to reach the air pressure Ps from the atmospheric pressure.

Subsequently, the gas detector 14 detects the gas Gs that leaks out from the case 21 by measuring the density of the gas Gs inside the chamber 11, for example. When the gas Gs is detected, since the airtightness of the case 21 is not sufficient, the power storage device 2 is determined as a defective product. On the other hand, when the gas Gs is not detected, since the airtightness of the case 21 is sufficient, the power storage device 2 is determined as a conforming product.

The airtightness is inspected by the gas detector 14, and the computing device 16 refers to the air pressure rising time data, acquires the capacity corresponding to the time needed for the air pressure inside the case 21 to reach the air pressure P2 from the air pressure P1, and defines it as the capacity of the space S of the case 21. Then, the computing device 16 calculates the cavity amount in the inside of the electrode assembly inside the case 21 from the capacity of the space S.

Next, the switching valve 18 connects the suction machine 17 and the case 21, and the suction machine 17 sucks the gas Gv including the gas Gs from the inside of the case 21 until the air pressure inside the case 21 becomes a prescribed air pressure (0.1 MPa for example). Thus, the gas Gv is recovered from the inside of the case 21. After the gas Gv is recovered, the piping L3 is detached from the liquid injecting port 23.

In step S03, the electrolyte is injected to the power storage device 2 determined as the conforming product in step S02. In this step S03, piping for liquid injection is connected to the liquid injecting port 23. In addition, on the basis of the cavity amount inside the electrode assembly calculated in step S02, an injection amount of the electrolyte is calculated. Then, according to the calculated injection amount, the electrolyte is injected to the inside of the case 21. As above, the process to the liquid injecting step in the manufacturing process using the manufacturing device 1 is ended, advancing to the next step.

As described above, in the manufacturing device 1, by the time needed for a rise of the air pressure inside the case 21 while the gas Gs is supplied into the case 21 for the airtightness inspection, the capacity of the space S of the case 21 (that is, the cavity amount inside the electrode assembly) can be computed. Therefore, the airtightness inspection of the case 21 and the measurement of the capacity of the space S of the case 21 can be performed in parallel. As a result, the time needed for the airtightness inspection of the case 21 and the measurement of the capacity of the space S of the case 21 can be shortened, and the reduction in manufacturing efficiency of the power storage device can be suppressed while adopting the measurement of the internal space capacity.

In addition, since the manufacturing device 1 includes the switching valve 18, the gas supply source 12 and the suction machine 17 are not needed to be connected to the case 21 respectively, and a structure can be as simple as just connecting the gas supply source 12 and the suction machine 17 to the switching valve 18. Therefore, by utilizing the liquid injecting port 23 of the case 21, the gas supply source 12 and the suction machine 17 can be connected. Then, by switching the gas supply source 12 and the suction machine 17 using the switching valve 18, the supply of the gas Gs to the case 21 and the suction of the gas Gv from the case 21 can be easily switched.

Second Embodiment

Figure 3:
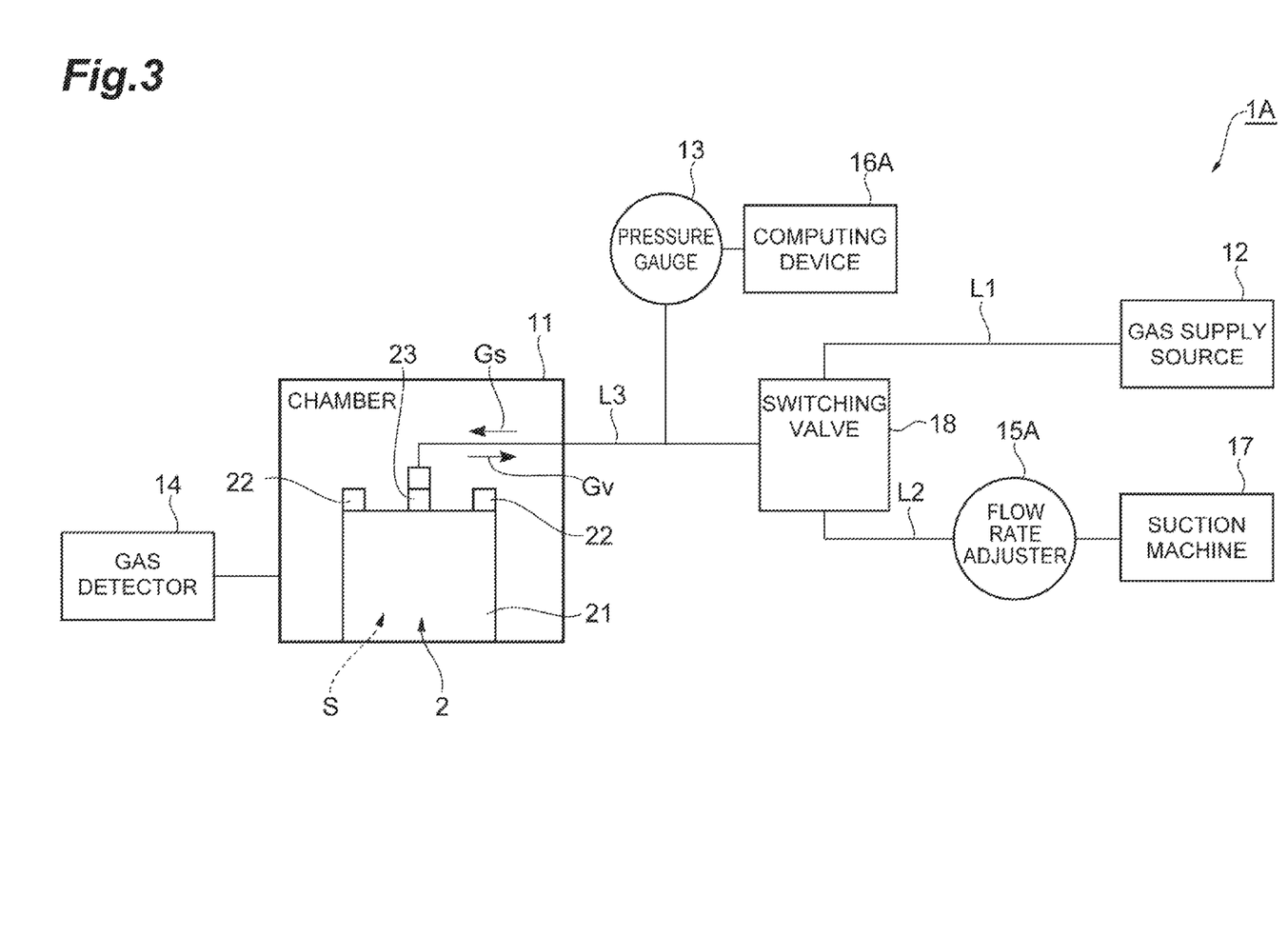
FIG. 3 is a schematic configuration diagram schematically illustrating a power storage device manufacturing device according to a second embodiment.

FIG. 3 is a schematic configuration diagram schematically illustrating a power storage device manufacturing device relating to the second embodiment. A manufacturing device 1A is different from the manufacturing device 1 at a point that the internal space capacity of the case 21 is measured when the gas Gv inside the case 21 of the power storage device 2 is sucked to be recovered. As illustrated in FIG. 3, the manufacturing device 1A includes a flow rate adjuster 15A and a computing device 16A instead of the flow rate adjuster 15 and the computing device 16.

The flow rate adjuster 15A is a device for fixing the flow rate of the gas Gv sucked from the inside of the case 21 by the suction machine 17. The flow rate adjuster 15A is a constant flow valve for example, and its opening is adjusted such that the flow rate of the gas Gv sucked from the inside of the case 21 becomes a predetermined flow rate. The flow rate adjuster 15A is provided on the piping L2 for example.

The computing device 16A is, similarly to the computing device 16, a device for computing the capacity of the space S inside the case 21, based on the air pressure measured by the pressure gauge 13. The computing device 16A computes the capacity of the space S inside the case 21, based on the air pressure measured by the pressure gauge 13, while the suction machine 17 sucks the gas Gv from the space S inside the case 21.

Specifically describing, the computing device 16A includes a timing unit configured to measure elapsed time when the gas Gv is sucked, and measures the time needed for the air pressure indicated by the air pressure information transmitted by the pressure gauge 13 to reach an air pressure P4 from an air pressure P3. Here, the air pressure P3 and the air pressure P4 are predetermined air pressures, and the air pressure P3 is higher than the air pressure P4. The computing device 16A stores beforehand air pressure lowering time data indicating a relation between the capacity of the space from which the gas Gv is sucked and the time needed for the air pressure of the space to reach the air pressure P4 from the air pressure P3 when the flow rate of the gas Gv to be sucked is fixed. The air pressure lowering time data can be provided in a form of a table or a function or the like. The computing device 16A refers to the air pressure lowering time data, acquires the capacity corresponding to the measured time, and defines the acquired capacity as the capacity of the space S.

For example, the air pressure P3 may be the air pressure Ps. In this case, the computing device 16A measures the time needed for the air pressure inside the case 21 to reach the air pressure P4 from the time when the suction of the gas Gv from the space S of the case 21 is started by the suction machine 17.

Next, the power storage device manufacturing process using a manufacturing device 1A will be described. The power storage device manufacturing process using the manufacturing device 1A is different from the power storage device manufacturing process using the manufacturing device 1 only in step S02. Step S02 will be described below.

In step S02, the airtightness of the case 21 assembled in step S01 is inspected, and the capacity of the space S inside the case 21 is measured. Specifically, the power storage device 2 is housed inside the chamber 11, and one end of the piping L3 is connected to the liquid injecting port 23 of the power storage device 2. Then, the switching valve 18 connects the gas supply source 12 and the case 21, and the gas supply source 12 starts the supply of the gas Gs to the inside of the case 21.

Then, the pressure gauge 13 measures the air pressure inside the case 21, and whether or not the air pressure inside the case 21 has reached the air pressure Ps is determined. The gas supply source 12 continuously supplies the gas Gs into the case 21 until the air pressure inside the case 21 reaches the air pressure Ps. Then, as the air pressure inside the case 21 reaches the air pressure Ps, the gas supply source 12 stops the supply of the gas Gs.

Subsequently, the gas detector 14 detects the gas Gs that leaks out from the case 21 by measuring the density of the gas Gs inside the chamber 11, for example. When the gas Gs is detected, since the airtightness of the case 21 is not sufficient, the power storage device 2 is determined as a defective product. On the other hand, when the gas Gs is not detected, since the airtightness of the case 21 is sufficient, the power storage device 2 is determined as a conforming product.

After the airtightness is inspected by the gas detector 14, the switching valve 18 connects the suction machine 17 and the case 21, and the suction machine 17 sucks the gas Gv including the gas Gs from the inside of the case 21 until the air pressure inside the case 21 becomes a prescribed air pressure. At the time, the flow rate of the gas Gv sucked by the suction machine 17 is adjusted to be fixed by the flow rate adjuster 15A.

The pressure gauge 13 measures the air pressure inside the case 21 throughout the suction of the gas Gv, and whether or not the air pressure inside the case 21 has reached the prescribed air pressure (0.1 MPa for example) is determined. The suction machine 17 continuously sucks the gas Gv from the inside of the case 21 until the air pressure inside the case 21 reaches the prescribed air pressure. Then, in response to meeting the condition that the air pressure inside the case 21 reaches the prescribed air pressure, the suction machine 17 stops the suction of the gas Gv. At the time, the computing device 16A measures the time needed for the air pressure inside the case 21 to reach the air pressure P4 from the air pressure P3. For example, the computing device 16A measures the time needed for the air pressure inside the case 21 to reach the atmospheric pressure from the air pressure Ps.

Next, the computing device 16A refers to the air pressure lowering time data, acquires the capacity corresponding to the time needed for the air pressure inside the case 21 to reach the air pressure P4 from the air pressure P3, and defines the acquired capacity as the capacity of the space S of the case 21. Then, the computing device 16A calculates the cavity amount in the inside of the electrode assembly inside the case 21 from the capacity of the space S. Then, the process advances to step S03.

As described above, the manufacturing device 1A measures the time needed for lowering of the air pressure inside the case 21 while the gas Gv including the gas Gs supplied into the case 21 for the airtightness inspection is sucked from the case 21. Then, the manufacturing device 1A computes the capacity of the space S of the case 21 (that is, the cavity amount inside the electrode assembly) by the time needed for the lowering of the air pressure inside the case 21. Therefore, the airtightness inspection of the case 21 and the measurement of the capacity of the space S of the case 21 can be performed in parallel. As a result, the time needed for the airtightness inspection of the case 21 and the measurement of the capacity of the space S of the case 21 can be shortened, and the reduction in manufacturing efficiency of the power storage device can be suppressed while adopting the measurement of the internal space capacity.

Third Embodiment

Next, a mode of measuring the internal space capacity in a liquid injecting step of injecting the electrolyte to a cell 10 (which corresponds to the case 21 in the first embodiment and the second embodiment) of a secondary battery which is one kind of the power storage device will be described. In the following embodiment, the secondary battery is defined as a lithium-ion secondary battery. However, the power storage device is not limited to the lithium-ion secondary battery, and may be another secondary battery such as a nickel-hydrogen secondary battery, or another power storage device with an electrolyte (for example, an electric double layer capacitor or the like).

Figure 4:
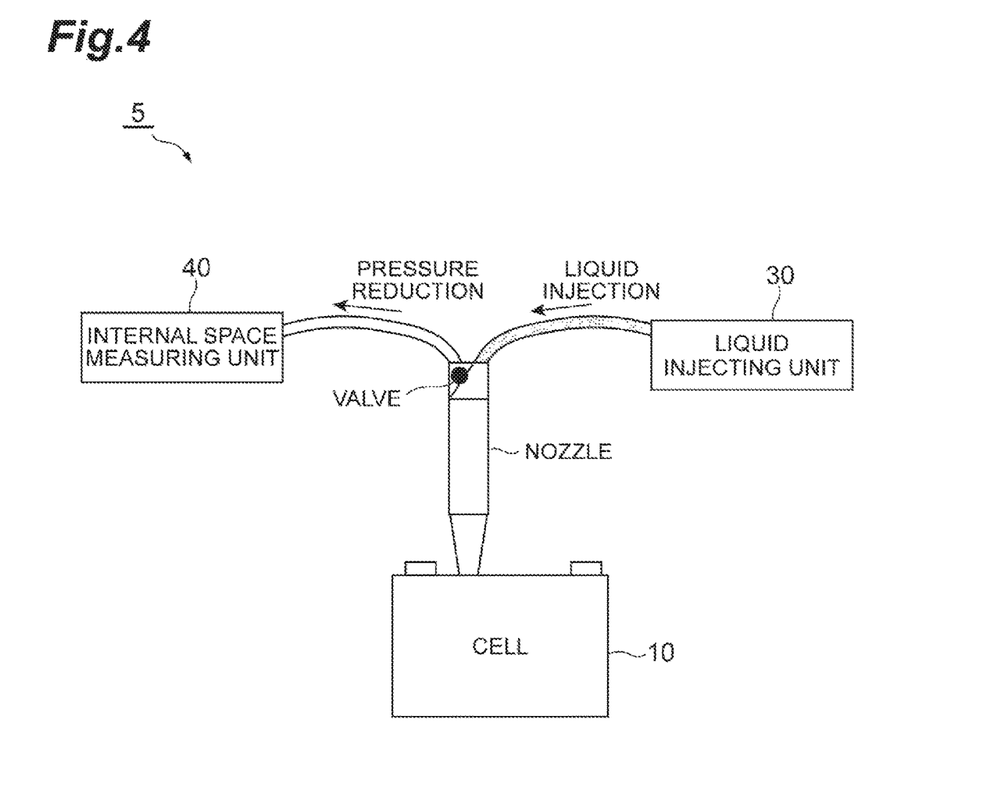
FIG. 4 is a schematic configuration diagram illustrating an electrolyte injection device relating to one mode of an embodiment.
Figure 5:
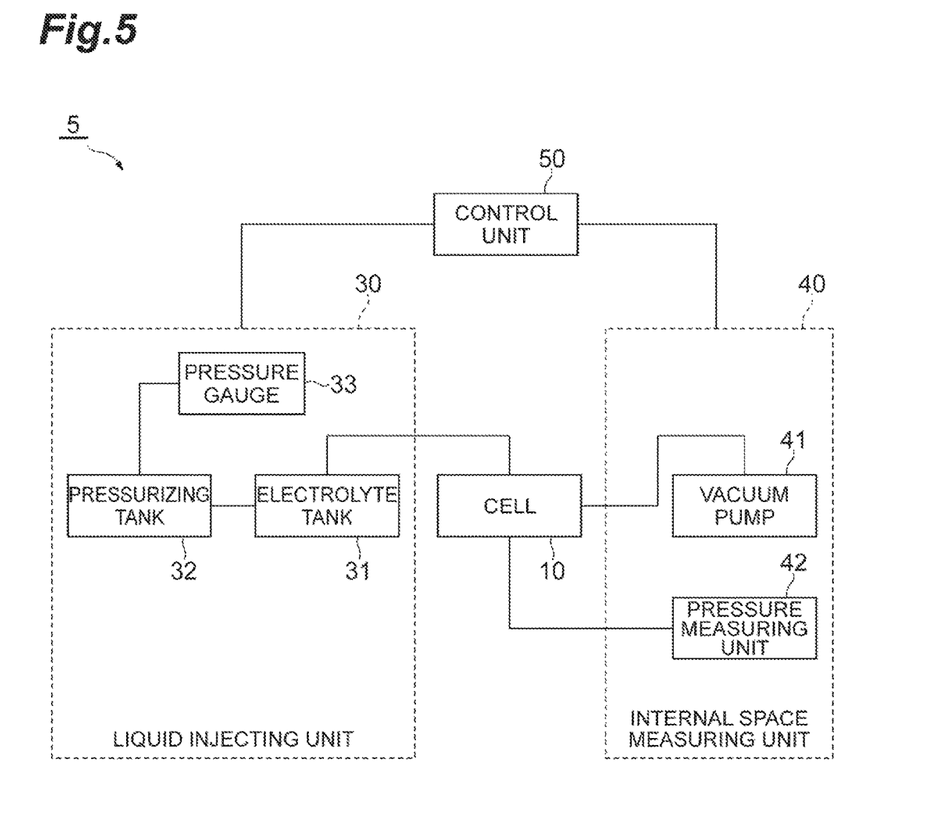
FIG. 5 is a diagram illustrating a configuration of each unit of the liquid injection device in FIG. 4.

As illustrated in FIG. 4 and FIG. 5, in an liquid injection device 5 for a secondary battery, to the cell (case) 10 of the secondary battery, a liquid injecting unit (liquid injecting unit) 30 and an internal space measuring unit (measuring unit) 40 are attached.

In the cell 10, the electrode assembly not shown in the figure is housed in the inside, and the cavity is formed inside and outside the electrode assembly inside the cell 10. The cavity inside the electrode assembly is the space inside the hole in the inside of the porous active material and the separator in the configuration of the electrode assembly, and becomes a passage of ions after the electrolyte is injected. Since the cavity amount inside the electrode assembly is affected by the variation in the density of the active material layer, the cavity amount cannot be obtained from an appearance and a dimension. The cavity amount outside the electrode assembly in the cell 10 can be obtained by a difference between an internal volume of the cell 10 and the volume of internal components such as the electrode assembly and a conductive member. These values are easy to measure and therefore the variation on manufacturing of the cavity amount outside the electrode assembly is relatively small and can be considered as a constant determined by design.

The liquid injecting unit 30 injects the electrolyte to the inside of the cell 10 through a nozzle inserted to an opening provided on an upper lid of the cell 10. The liquid injecting unit 30 includes mainly an electrolyte tank 31 configured to store the electrolyte, a pressurizing tank 32 configured to pressurize the electrolyte tank 31, and a pressure gauge 33 configured to measure a pressure of the pressurizing tank 32. An amount of the electrolyte injected from the liquid injecting unit 30 into the cell 10 is transmitted as a cavity volume from the internal space measuring unit 40 as described later.

The internal space measuring unit 40 measures the cavity volume inside the cell 10 by reducing the pressure inside the cell 10. The internal space measuring unit 40 includes mainly a vacuum pump 41 configured to reduce the pressure inside the cell 10, and a pressure measuring unit 42 configured to measure the pressure inside the cell 10 and calculates the cavity volume. The pressure measuring unit 42 has at least a pressure gauge and a timer, calculates (measures) the time after the vacuum pump 41 starts pressure reduction until the pressure inside the cell 10 reaches a predetermined pressure, and calculates the cavity volume from the calculated time. By calculating a difference between the calculated cavity volume and the cavity amount (constant) outside the electrode assembly, the cavity amount inside the electrode assembly can be obtained.

As illustrated in FIG. 5, the liquid injection device 5 further includes a control unit 50. The control unit 50 transmits information regarding the cavity volume inside the cell 10 measured in the internal space measuring unit 40 to the liquid injecting unit 30. Note that, in a configuration that the information regarding the cavity volume is directly transmitted from the internal space measuring unit 40 to the liquid injecting unit 30, the control unit 50 can be appropriately omitted.

Figure 6:
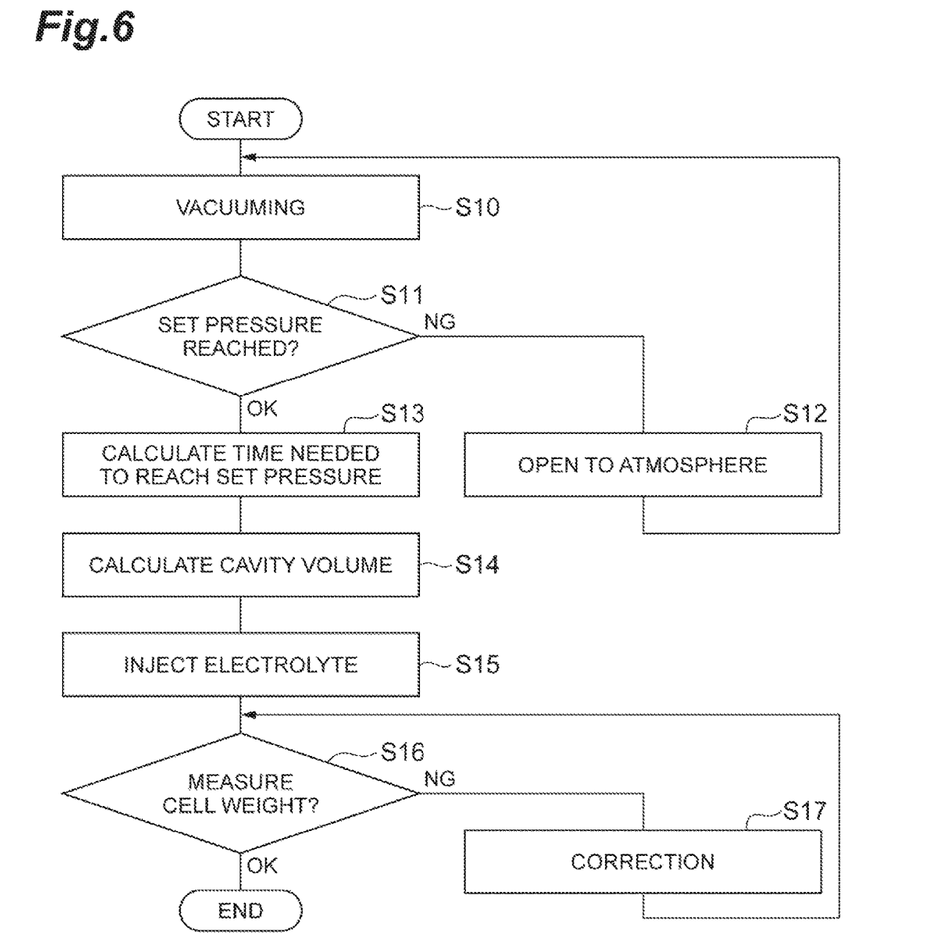
FIG. 6 is a flowchart illustrating an electrolyte injection method relating to one mode of the embodiment.

Next, a liquid injection method of injecting the electrolyte into the cell 10 of the secondary battery using the liquid injection device 5 described above will be described with reference to a flowchart in FIG. 6.

When injecting the electrolyte into the cell 10, first, by the vacuum pump 41 of the internal space measuring unit 40, vacuuming is performed in order to reduce the pressure inside the cell 10 (a process S10). This process S10 is a process for accelerating impregnation of the electrolyte to be injected in the liquid injecting step into the electrode assembly. Since the space inside the hole in the inside of the electrode assembly consists of fine pores, when just the electrolyte is injected, it is not easy to take air out of the space inside the hole, and it takes a lot of time for impregnation of the electrolyte. Therefore, by performing the process S10 prior to the injection of the electrolyte, the air is removed beforehand from the space inside the hole. Then, using the pressure measuring unit 42, whether or not the pressure inside the cell 10 reaches a set pressure is determined (a process S11), and when the pressure inside the cell 10 does not reach the set pressure, it is returned to the atmospheric pressure by performing release to the atmosphere (a process S12), and then vacuuming is performed again.

When the pressure inside the cell 10 reaches the set pressure, while maintaining it at the set pressure, the pressure measuring unit 42 calculates the time from pressure reduction start until the pressure inside the cell 10 reaches the set pressure (a process S13). Further, the pressure measuring unit 42 calculates the cavity volume inside the cell 10 from the calculated time (a process S14). By the cavity volume calculated in this way, the cavity amount inside the electrode assembly described above is calculated, and a value obtained by adding a small amount to the cavity amount inside the electrode assembly is an appropriate amount of the electrolyte to be injected into the cell 10. Note that a reason for not filling all the cavity inside the cell 10 with the electrolyte is that, when the electrode terminals and the conductive member that electrically connects the electrode terminals and the electrode assembly are immersed in the electrolyte, it causes a short circuit.

The information regarding the cavity volume calculated in the pressure measuring unit 42 is transmitted to the liquid injecting unit 30 through the control unit 50. The liquid injecting unit 30 injects the electrolyte in an amount based on the transmitted cavity volume (for example, the value obtained by adding the small amount to the cavity amount inside the electrode assembly) from the electrolyte tank 31 to the cell 10 through the nozzle (a process S15). At the time, since the pressure inside the cell 10 is in a state of being maintained at the set pressure to which vacuuming is performed in the process S10, by a pressure difference between the inside of the cell 10 and the outside (the electrolyte tank), the electrolyte is injected.

Finally, in order to confirm that the appropriate amount of the electrolyte is injected, weight of the cell 10 may be measured (a process S16). When this process is added, it is possible to detect a case that an intended amount of the electrolyte is not injected due to abnormality of the manufacturing device for example, such as the case that the electrolyte overflows during the injection or the case that clogging is generated in a supply route of the electrolyte. If the weight of the cell 10 to which the electrolyte is injected is out of a predetermined range, correction of additionally injecting the electrolyte off a line is performed (a process S17), and the weight of the cell is measured again.

As described above, in the liquid injection method using the liquid injection device 5 of the secondary battery, in a measuring process (the processes S10-S14), the internal space measuring unit 40 performs both of the pressure reduction inside the cell 10 and the measurement of the cavity volume. Thus, the liquid injecting unit 30 can inject the electrolyte for the appropriate amount based on the cavity volume measured in the measuring process into the pressure-reduced cell 10 in the liquid injecting process (the process S15). That is, since the pressure reduction inside the cell 10 and the measurement of the cavity volume are simultaneously performed by the internal space measuring unit 40 prior to the liquid injection, the electrolyte can be efficiently injected.

In addition, in the liquid injection method by the liquid injection device 5 described above, since the cavity volume of the cell 10 is directly measured, compared to the case of estimating the cavity volume by the weight as in a conventional technology, the appropriate injection amount can be obtained with high accuracy.

Note that the power storage device manufacturing method, the manufacturing device, the liquid injection device, and the liquid injection method relating to the present invention are not limited to the above-described embodiments. For example, a step performed in parallel with the measurement of the internal space capacity of the case of the power storage device is not limited to the case airtightness inspecting step and the electrolyte injecting step as long as it is a step of performing a pressure operation inside the case after the case is sealed and before the electrolyte is injected and a process using the change of the pressure inside the case caused by the pressure operation.

In addition, the manufacturing device 1 may not include the suction machine 17 and the switching valve 18.

In the manufacturing devices 1 and 1A, the gas supply source 12 and the suction machine 17 are switched by the switching valve 18 and connected to the case 21, however, it is not limited thereto. For example, the gas supply source 12 and the suction machine 17 may be connected to the case 21 respectively.

The manufacturing devices 1 and 1A fix the flow rate of the gas Gs supplied by the gas supply source 12 or the flow rate of the gas Gv sucked by the suction machine 17 by including the flow rate adjuster 15 or the flow rate adjuster 15A, however, it is not limited thereto. The manufacturing devices 1 and 1A may include both of the flow rate adjuster 15 and the flow rate adjuster 15A, and may fix the flow rate of the gas Gs supplied by the gas supply source 12 and the flow rate of the gas Gv sucked by the suction machine 17.

The computing device 16 may store the air pressure rising time data respectively for various flow rates. In addition, the computing device 16 may store the air pressure rising time data respectively for combinations of the various air pressures P1 and the various air pressures P2.

The computing device 16A may store the air pressure lowering time data respectively for various flow rates. In addition, the computing device 16A may store the air pressure lowering time data respectively for combinations of the various air pressures P3 and the various air pressures P4.

The computing device 16A may store data of the air pressure per unit time for a fixed flow rate. For example, in the first embodiment, as the cavity amount is larger, the rise of the air pressure becomes gentler and the air pressure after the lapse of the unit time becomes lower.

The manufacturing devices 1 and 1A are also applicable to a power storage device using a spacer for example. It is also possible to form the positive electrode or negative electrode active material layer while fixing the pressure during the roll press, for the variation when coating the positive electrode or negative electrode slurry. Since the variation of the thickness is large for the electrode assembly manufactured by laminating such a positive electrode or negative electrode, it is proposed to adjust the thickness using a spacer made of a resin or the like for example and to house it without a gap inside the case. For the electrode assembly described above, though the density of the positive electrode or negative electrode active material layer is fixed, the cavity amount inside varies. Thus, internal space measuring is effective for obtaining the optimum injection amount of the electrolyte.

The manufacturing devices 1 and 1A may further include a controller. The controller is a computer including a processor and a memory or the like for example. The controller may control the gas supply source 12 to start and stop the supply of the gas Gs. The controller may control the gas detector 14 to detect the gas Gs inside the chamber 11. The controller may control the computing devices 16 and 16A to compute the capacity of the space S based on the air pressure measured by the pressure gauge 13. The controller may control the suction machine 17 to start and stop the suction of the gas Gv. The controller may control the switching valve 18 to switch the gas supply source 12 and the suction machine 17 and connect one of them to the case 21. The operations of the gas supply source 12, the suction machine 17 and the switching valve 18 can be performed using an actuator for example. In this case, by the controller controlling the individual units of the manufacturing devices 1 and 1A, it becomes possible to automate the power storage device manufacturing process using the manufacturing devices 1 and 1A.

REFERENCE SIGNS LIST 1, 1A . . . manufacturing device, 5 . . . liquid injection device, 2 . . . power storage device, 10 . . . cell, 11 . . . chamber, 12 . . . gas supply source, 13 . . . pressure gauge, 14 . . . gas detector, 15, 15A . . . flow rate adjuster, 16, 16A . . . computing device (computing unit), 17 . . . suction machine, 18 . . . switching valve (valve), 21 . . . case, 30 . . . liquid injecting unit, 40 . . . internal space measuring unit, S . . . space.

The invention claimed is:

1. A power storage device manufacturing method comprising:
    sealing a lid to a case body of a case, during a manufacturing process of the power storage device, wherein the case houses an electrode assembly of the power storage device;
    after the sealing, measuring an internal space capacity of the case while conducting a pressure operation of increasing or reducing a pressure inside the case to be higher or lower than an atmospheric pressure,
    wherein the internal space capacity of the case is measured based on a change with time of the pressure inside the case caused by the pressure operation,
    the pressure operation is performed during the manufacturing process by supplying gas into the case or sucking gas from the case via a piping connected to the case, and
    the internal space capacity is measured in a state of electrolyte being absent from the case; and
    injecting an electrolyte into the case after the measuring of the internal space capacity and during the manufacturing process of the power storage device.

2. The power storage device manufacturing method according to claim 1, wherein the measuring the internal space capacity includes an airtightness inspecting step for the case, wherein a sealed chamber accommodates the case of the power storage device, and an air pressure inside the sealed chamber is measured to detect a gas that has leaked out from the case during the measuring of the internal space capacity of the case.

3. The power storage device manufacturing method according to claim 1, wherein the internal space capacity is measured based on a time needed for the pressure inside the case to reach a predetermined pressure due to the pressure operation inside the case.

4. The power storage device manufacturing method according to claim 1, wherein a cavity amount inside the case is calculated based on the internal space capacity.

5. The power storage device manufacturing method according to claim 1, further comprising calculating an amount of the electrolyte to be injected into the case based on the result of the measurement of the internal space capacity.

* * * * *